United States Patent [19]
Wenzel

[11] 3,973,790
[45] Aug. 10, 1976

[54] CARDAN FRAME WITH TWO SWIVEL JOINTS

[75] Inventor: Kurt Wenzel, Achern, Baden, Germany

[73] Assignee: Angenendt Verpackungssysteme GmbH, Achern, Baden, Germany

[22] Filed: Mar. 9, 1973

[21] Appl. No.: 339,609

[30] Foreign Application Priority Data
Mar. 10, 1972 Germany............................ 2211591

[52] U.S. Cl.................................... 285/61; 100/8; 285/119; 285/168; 285/181; 285/190
[51] Int. Cl.²....................... F16L 3/00; F16L 27/00
[58] Field of Search ............. 285/168, 190, 61, 181, 285/119; 100/8

[56] References Cited
UNITED STATES PATENTS

| | | | |
|---|---|---|---|
| 673,280 | 4/1901 | Moran ........................... | 285/168 X |
| 960,204 | 5/1910 | Sehnert et al................... | 285/168 X |
| 1,985,012 | 12/1934 | Boehm.............................. | 285/190 |
| 2,048,313 | 7/1936 | Adolfson......................... | 285/168 X |
| 2,088,418 | 7/1937 | King.................................. | 285/61 |
| 3,727,954 | 4/1973 | Oliver............................... | 285/168 |

FOREIGN PATENTS OR APPLICATIONS

| | | | |
|---|---|---|---|
| 1,303,139 | 8/1962 | France............................. | 285/190 |
| 696,784 | 10/1930 | France............................. | 285/168 |

*Primary Examiner*—Thomas F. Callaghan
*Attorney, Agent, or Firm*—Walter Becker

[57] ABSTRACT

A cardan frame for suspending compressed air operable tightening and closing devices for strapping packages, boxes, coils, and the like. The cardan frame is formed by two tubular arc-shaped conduit sections for conveying compressed air therethrough. The interior of the two conduit sections is interconnected by a first swivel joint while one end of one of the two conduit sections has connected thereto an eye for suspending the cardan frame. The other end of the other conduit section has connected thereto a second swivel section to which is suspended the respective desired strapping device.

2 Claims, 2 Drawing Figures

CARDAN FRAME WITH TWO SWIVEL JOINTS

The present invention relates to a cardan frame with two swivel joints for suspending compressed air-operable clamping and closing devices for strappings of packages and the like.

Cardan frames of this type serve for suspending clamping and closing devices by means of weight compensating spring extenders. Devices of this type are intended to enable the operator without great efforts to move the clamping and closing device into any possible working positions on a package.

With heretofore known suspensions by means of a cardan frame, however, difficulties are encountered with regard to the compressed air feeding hose. The feeding hose not only interferes with the operator in various working positions of the device, but the cardan frame sometimes also buckles when being handled and the device due to pressure drop will work no longer.

It is, therefore, an object of the present invention to provide a compressed air feeding with clamping and closing devices suspended by means of a cardan frame which will no longer interfere with the operator and will be safe in operation.

These and other objects and advantages of the invention will appear more clearly from the following specification, in connection with the accompanying drawings, in which.

Figure 1:
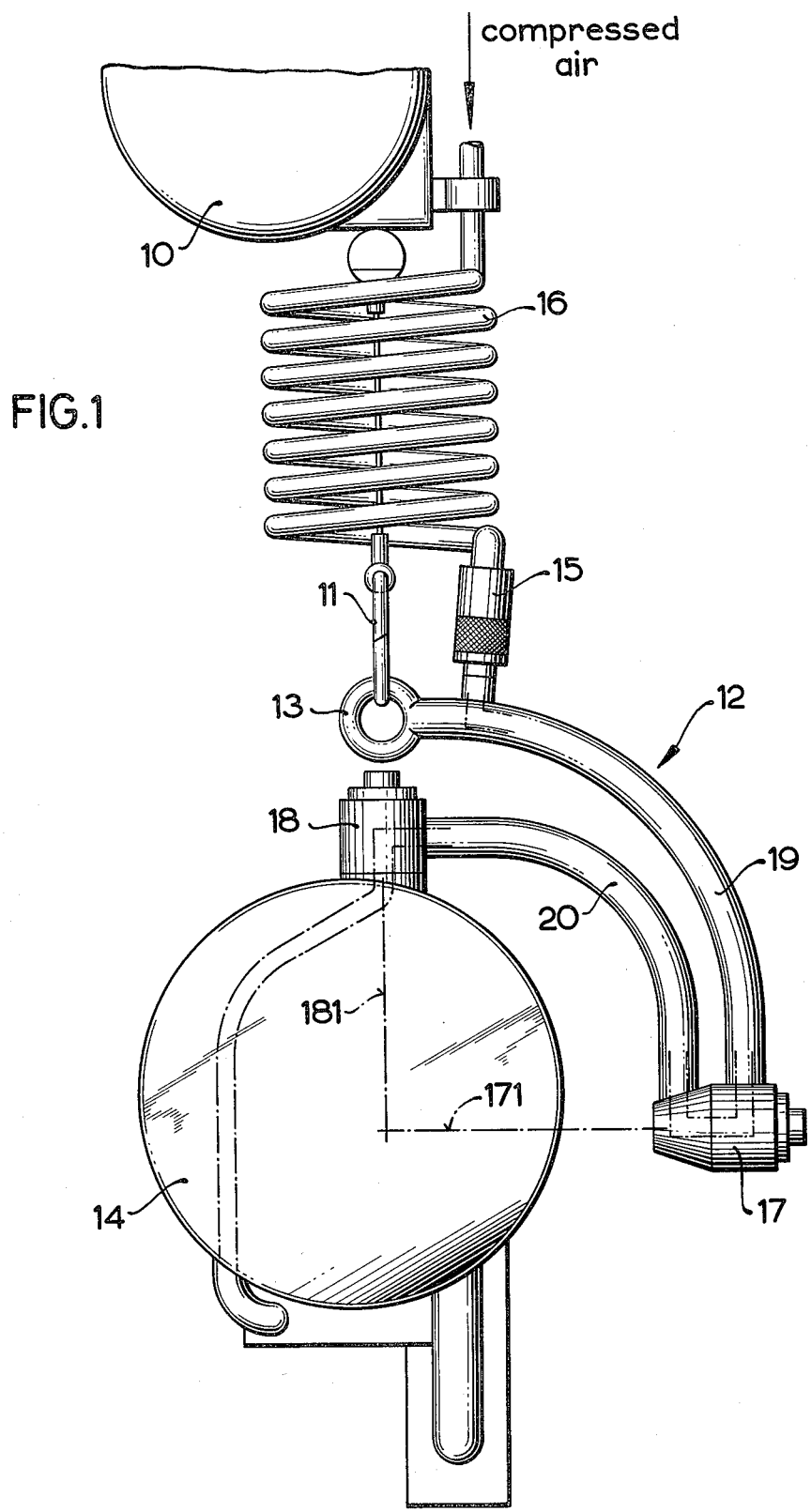
FIG. 1 illustrates a suspension of a tool in conformity with the invention.
Figure 2:
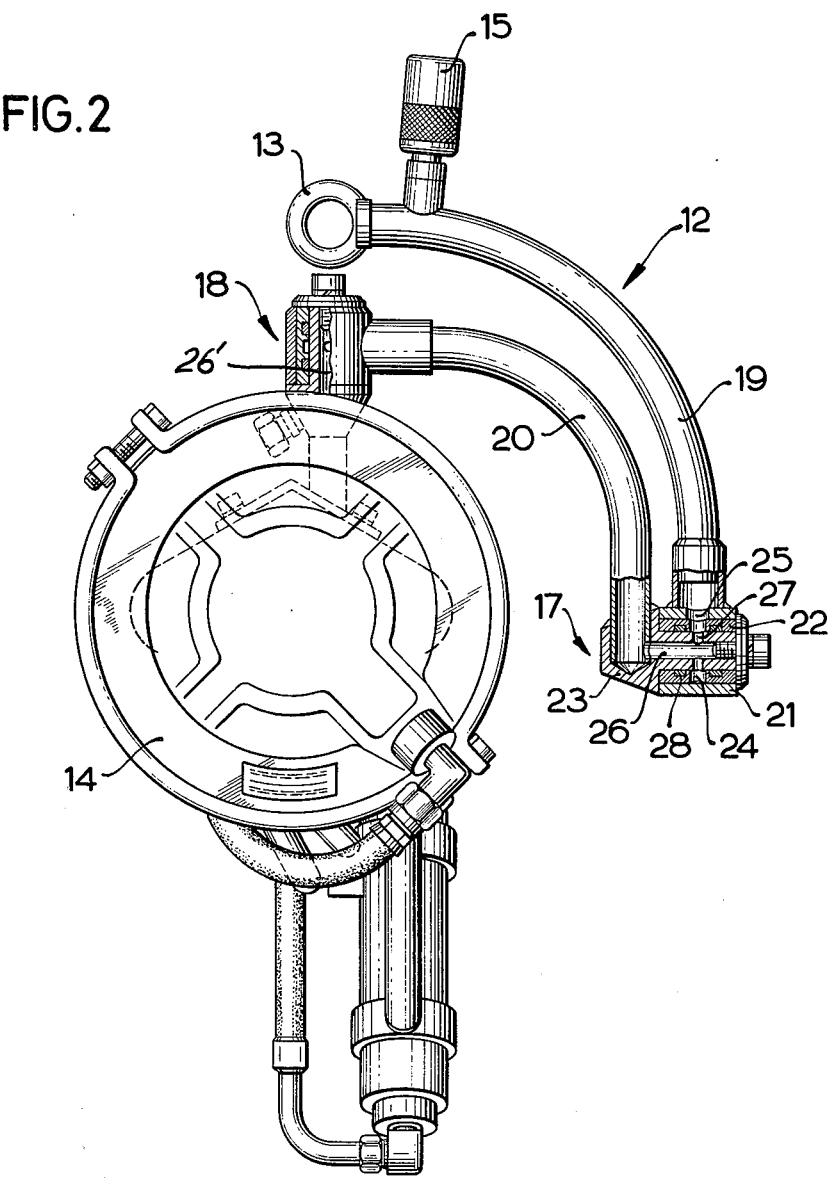
FIG. 2 shows a partial section through a tool with a cardan frame.

The cardan frame according to the invention which is provided with two swivel joints for suspending compressed air-operable clamping and closing devices for strappings of packages, etc. is characterized primarily in that the cardan frame forms a compressed air conduit of steel which comprises two tubular arches and two swivel joints. For purposes of feeding the compressed air while maintaining the movability of the cardan frame, it is advantageous to provide the swivel joints with a cylindrical part equipped with a bushing, which cylindrical part is rotatably mounted on a bolt part while said bushing has an annular groove and while said bolt part comprises an axial bore and a plurality of transverse bores.

Referring now to the drawings in detail, a clamping and closing tool 14 is suspended on a spring expander 10 through the intervention of a hook 11 and an eye 13 which is connected to a cardan frame 12.

The cardan frame 12 forms a compressed air conduit of steel which is adapted through a plug coupling 15 and an elastic compressed air conveying hose 16 to be acted upon by compressed air.

The cardan frame 12 includes two swivel joints 17, 18 which are of substantially identical construction and which are connected to tubular arches 19 and 20.

The swivel joint 17 interconnects the two tubular arches 19, 20 which make up the cardan frame. The swivel joint 18 connects the cardan frame 12 with the clamping and closing tool 14 and conveys compressed air thereto.

The swivel joints 17, 18 comprise an outer cylindrical part 21 into which a bushing 22 is pressed. A bolt part 23 is rotatably journaled in the bushing 2 and is rotatable about the axis of rotation 171 and 181 respectively. An annular groove 24 which has been cut into the bushing 22 is, through a feeding bore 25, supplied with compressed air from the arches 19, 20 respectively. The bolt part 23 is equipped with an axial bore 26 which communicates through transverse bores 27 with the annular groove 24.

Bushing 22 is sealed relative to the bolt part 23 by two sealing rings 28. The axial bore 26 of the swivel joint 17 conveys compressed air into the arch 20, whereas the bore 26 of the swivel joint 18 conveys compressed air to the clamping and closing tool.

It is, of course, to be understood that the present invention is, by no means, limited to the specific showing in the drawings, but also comprises any modifications within the scope of the appended claims.

What I claim is:

1. In combination with a strapping device including a conduit means to supply compressed air to said strapping device comprising: a spring expander, a first substantially 90° arcuate conduit having a connection to said conduit means for compressed air and attaching means at one end suspending it vertically on said spring expander, a second substantially 90° arcuate conduit, a first swivel joint connecting the other end of said first conduit to one end of the second conduit for movement of said second conduit about a horizontal axis and for transmitting air from said first to said second conduit, a second swivel joint on the other end of said second conduit connected to said strapping device for transmitting air to said strapping device and for movement of said strapping device about an axis lying in a vertical plane through said attaching means and perpendicular to said horizontal axis and laterally spaced from said first swivel joint, so that air is transmitted freely through said first and second swivel joints to said strapping device in every horizontal and vertical position with its center of gravity maintained substantially in the line of said attaching means.

2. In the combination according to claim 1, in which each of said swivel joints includes a cylindrical member and a bushing arranged within said cylindrical member and firmly connected thereto, and also includes a fitting having a hollow cylindrical section extending into said bushing and rotatably supporting the same and said cylindrical member, said bushing having an annular groove, and said hollow cylindrical section having an axial bore and a plurality of transverse bores establishing communication between the interior of said first and second conduits.

* * * * *

UNITED STATES PATENT OFFICE
CERTIFICATE OF CORRECTION

Patent No. 3,973,790　　　　　　　　　　Dated August 10, 1976

Inventor(s) Kurt Wenzel

It is certified that error appears in the above-identified patent and that said Letters Patent are hereby corrected as shown below:

The assignee should read as follows:

-- [73] Assignee: Angenendt Verpackungssysteme GmbH, Hagen-Kabel, Germany --.

Signed and Sealed this

First Day of March 1977

[SEAL]

Attest:

RUTH C. MASON
*Attesting Officer*

C. MARSHALL DANN
*Commissioner of Patents and Trademarks*